Aug. 1, 1939.  C. F. DAVEY  2,168,062
TRAILER FOR MOTOR VEHICLES
Filed Aug. 1, 1936  3 Sheets-Sheet 1
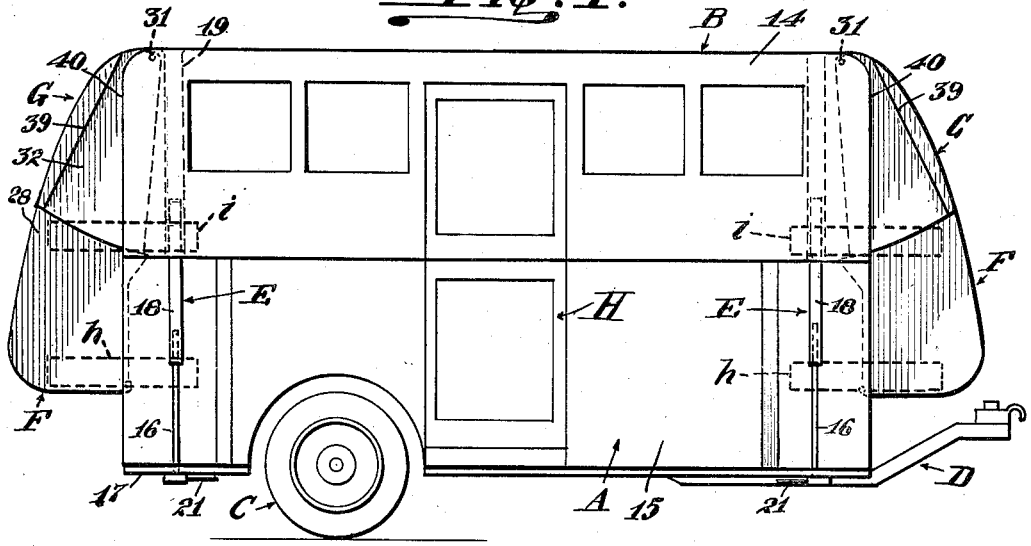
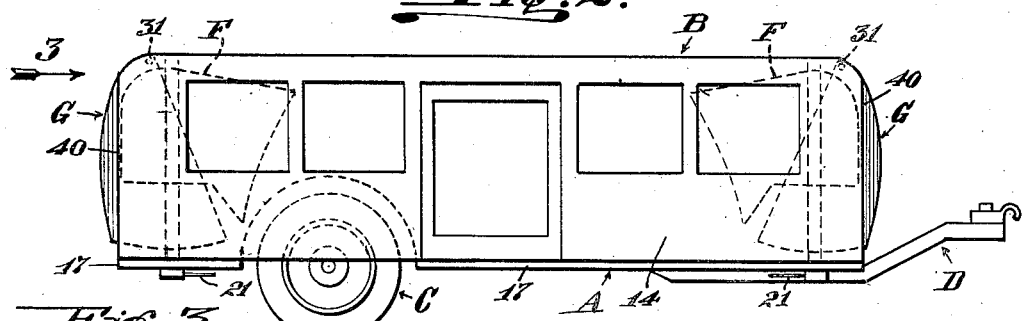
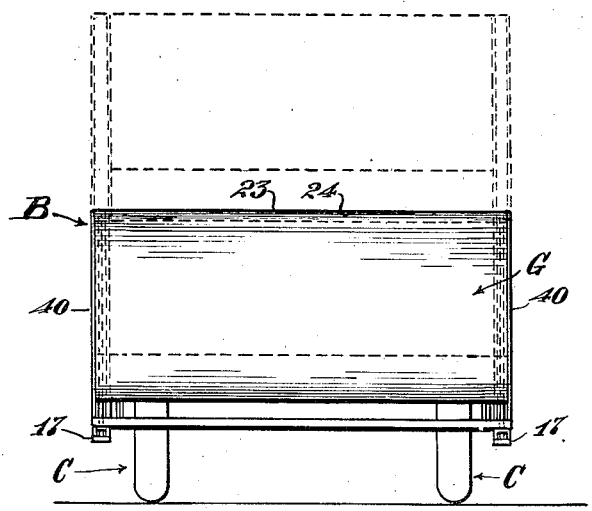
Inventor
Cecil F. Davey:
By
R. S. Burry
Attorney

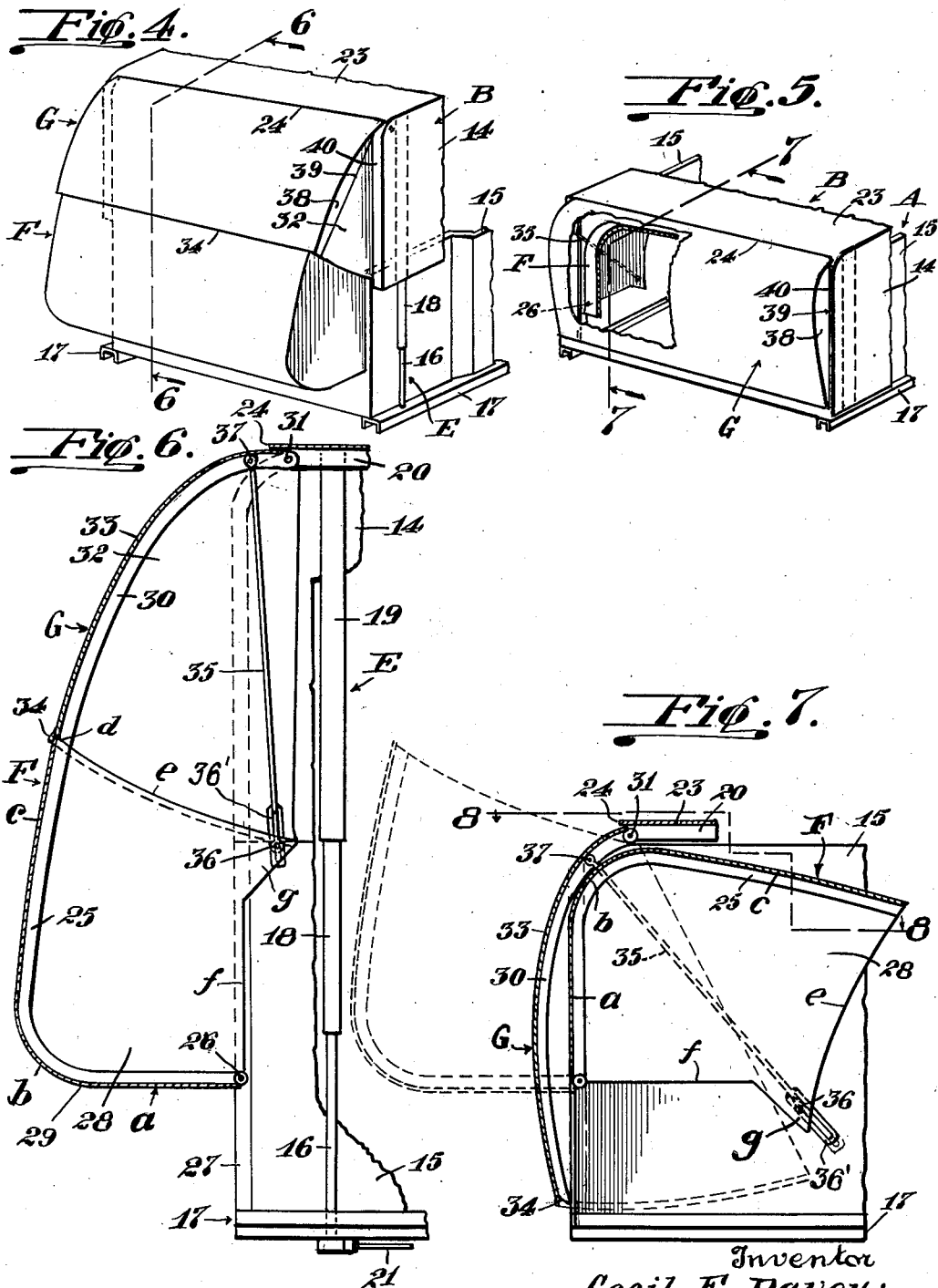

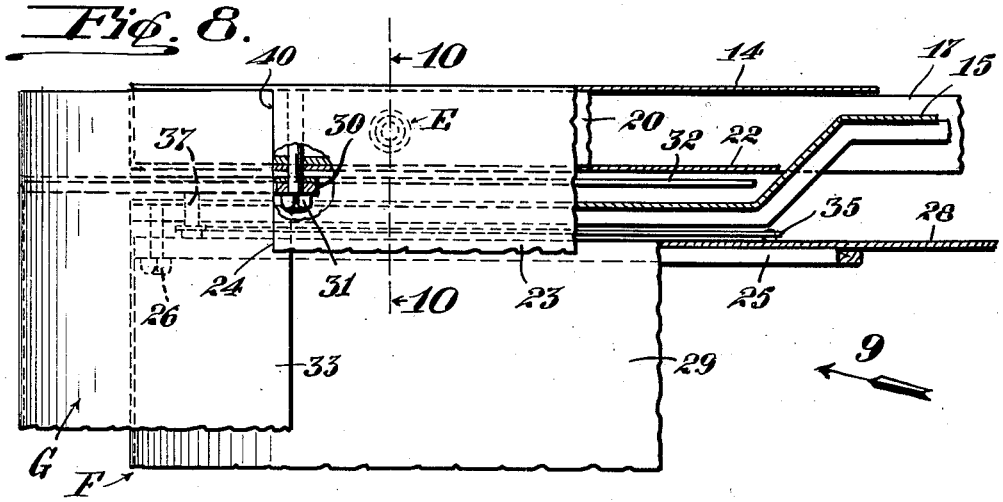
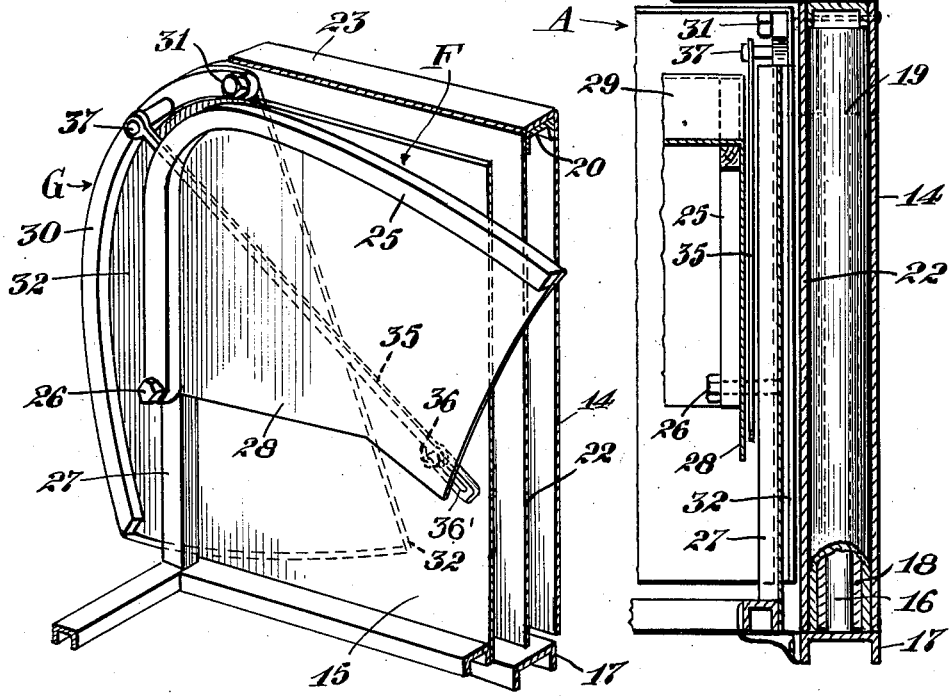

Patented Aug. 1, 1939

2,168,062

UNITED STATES PATENT OFFICE 2,168,062

TRAILER FOR MOTOR VEHICLES

Cecil F. Davey, Los Angeles, Calif.

Application August 1, 1936, Serial No. 93,831

10 Claims. (Cl. 296—23)

This invention relates to a trailer for motor vehicles and more particularly pertains to a trailer of the house type designed to be towed by an automobile.

An object of the invention is to provide a house trailer having a body portion which is capable of being folded or collapsed to reduce its height and length and thereby reduce its wind resistance, lower its center of gravity, and shorten its length and thus facilitating its transportation.

Another object is to provide a house trailer having a vertically collapsible upper portion constructed to afford ample head room interiorly of the trailer body when in its elevated position, and to afford range of vision thereover by occupants of a vehicle by which the trailer is being towed when in a collapsed position, and embodying an effective means for raising and lowering the collapsible upper portion.

Another object is to provide a trailer having a collapsible upper portion telescopically associated with a lower portion including a foldable end portion adapted to be folded interiorly of the folded upper and lower portions to shorten the length of the trailer body when in its collapsed position.

Another object is to provide a house trailer body having an upper portion moveable vertically relative to a lower portion and to and from an extended position, with each of said portions having a foldable end portion formed to be arranged to increase the space interiorly of the trailer body when the upper portion of the body is elevated relative to the lower portion thereof.

Another object is to provide foldable end sections for a vertically collapsible trailer body so formed and arranged and interconnected that on advancing and retracting relatively movable upper and lower portions of the trailer body with respect to each other the foldable end sections will automatically move in and out of their folded position.

A further object is to provide an arrangement in the foldable end sections whereby on disposing telescoping upper and lower portions on the trailer body in their collapsed or folded position the members of the end section will be disposed in a compact nested relation to each other.

With the foregoing objects in view together with such other objects and advantages as may subsequently appear, the invention is carried into effect as illustrated by way of example in the accompanying drawings, in which:

Fig. 1 is a view in side elevation of the trailer body showing it in its extended position, that is with an upper portion thereof elevated relative to a lower portion and foldable end sections in their outermost extended positions;

Fig. 2 is a view of the trailer body showing it in its collapsed or folded position in which its height and length are considerably reduced;

Fig. 3 is a view of the trailer body as seen in the direction of the arrow 3 of Fig. 2 showing the body in its folded position in full lines and indicating in dotted lines the position of the parts when extended;

Fig. 4 is a detail in perspective of an end portion of the trailer body with the parts in their extended position;

Fig. 5 is a perspective view of the end of the foldable trailer body showing the parts in their collapsed or folded position with parts broken away;

Fig. 6 is a view in section and elevation taken on line 6—6 of Fig. 4 as seen in the direction indicated by the arrows;

Fig. 7 is a view in section and elevation taken on the line 7—7 of Fig. 5 as seen in the direction indicated by the arrows;

Fig. 8 is a horizontal section and plan view taken on the line 8—8 of Fig. 7 depicting a fragmentary part of a side and end portion of the trailer body with the parts disposed in their folded position;

Fig. 9 is a detail in perspective as viewed in the direction indicated by the arrow 9 in Fig. 8, with portions broken away;

Fig. 10 is a view in vertical section taken on the line 10—10 of Fig. 8.

Referring to the drawings more specifically, A and B indicate, respectively, the lower and upper sections of the trailer body; the lower section A being suitably mounted on a conventional running gear as indicated by the wheels C, and being fitted at its forward end with a draw bar D for connection in suitable fashion with a motor vehicle, such as an automobile, by which the trailer is to be towed.

The upper section B is designed to be raised and lowered relative to the lower section A to assume an elevated position relative thereto as shown in Fig. 1, or to be disposed in a collapsed position in telescoped relation to the section A as shown in Fig. 2; the upper section B having side walls 14 which are arranged to extend over the exterior of the side walls 15 of the section A.

Means are provided for raising and lowering the section B relative to section A which is here shown as comprising a series of hydraulic jacks E arranged adjacent to each of the four corners of the trailer body, and so constructed in a conventional fashion that on application of hydraulic pressure thereto, the section B will be moved to an elevated position and there sustained by hydraulic pressure of the jacks or by suitable fastenings affording interconnection between the sections A and B, not necessary to be here shown. As here depicted, each of the hydraulic jacks E embodies a tubular standard 16 projecting upwardly from adjacent each end of side rails 17 of the chassis or frame of the lower section A of the trailer body; the standard 16 being arranged exteriorly of the side wall 15 of the section A which is recessed for the purpose as shown in Fig. 4, and carried on the standard 16 is an external telescoping sleeve 18 which telescopes into a tube 19 carried by the upper section B and here shown as arranged interiorly of the wall 14 and affixed at its upper end to a rail 20 of a top frame of the upper section B. The jacks E are thus concealed when the sections A and B are in their folded position.

Connecting with the lower ends of the standards 16 are conduits 21 leading to a suitable source of controlled hydraulic pressure supply, not necessary to be here shown, and by means of which the jacks are operated in conventional fashion to raise and lower the body section B.

In order to conceal the jacks from the interior of the trailer body when the section B is in its elevated position, the end portion of the section B extending over the recessed end portions of the sides 15 of the section A are provided with inner walls 22 as particularly shown in Figs. 8, 9, and 10, which extend parallel with the walls 14 in spaced relation thereto and overlie the tube 19 to conceal the latter.

The upper section B is fitted with a top membrane 23 which leads between the upper margins of the side walls 14 and terminates at the ends of the section B in marginal lips 24 extending transversely of the section B at the top of the ends of the side walls 14.

An important feature of the invention resides in providing the ends of the trailer body with foldable end sections each of which embodies a lower end section F carried on the lower section A and an upper end section G carried on the upper section B. The lower end section F embodies a pair of bow frames 25, there being bow frames at each end thereof pivoted to swing vertically on pivot pins 26 affixed to end standards 27 at the ends of the side walls 15; the end section F also embodying end plates 28 and a transverse closure wall 29 which end plates and wall are carried by the bows 25.

The section F is designed to be disposed in an extended position projecting outwardly from the end of the section A as particularly shown in Figs. 4 and 6, and when in this position the closure wall 29 will have a horizontally extending portion $a$ leading rearwardly from the end standards 27 of the side walls 15 which portion $a$ merges through an arcuate portion $b$ into an upstanding back portion $c$ terminating in a horizontal margin $d$ extending on a plane with the outer ends of the bows 25. The end plates 28 will then extend between the standards 27 and the upstanding back wall $c$. The then upper margins $e$ of each of the end plates 28 leads downwardly on an arc from the upper end of the bow 25 while the inner edge $f$ of the plate leads upwardly from the pivoted inner end of the bow in inwardly spaced relation to the end margin of the wall 15; the end plate 28 being formed with projections $g$ leading from the upper end of margin $f$.

The end section F is designed to be swung inwardly on the pivot 26 approximately a quarter revolution around the latter so that the wall portion $a$ will assume a substantially vertical position as shown in Fig. 7.

The end section G embodies a pair of bows 30 at the ends thereof which are pivoted at their upper ends by pivot pins 31 to the top rail 20 as particularly shown in Figs. 8 and 9; the bows 30 carrying end plates 32 extending parallel with the end plates 28 on the end section F and also carrying a back wall 33 which leads from the pivotal mounting of the bows 30 to the outer lower ends thereof and terminates at its lower margin in a lip 34 adapted to overlie the marginal portion of the wall 29 of the section F when the sections F and G are in their extended positions as shown in Fig. 6. The end plates 28 and 32 are spaced apart sufficient distance to accommodate the end portions of the walls 15 of the section A therebetween when the end sections F and G are disposed in their folded positions as shown in Figs. 9 and 10; the end plates 28 being designed to overlie the inner face of the walls 15 while the end plates 32 are designed to overlie the outer face of the side plates 15 and alongside the inner face of the wall 22.

Pivotally connected to pivot pin 36 on the projections $g$ on the end section F are links 35 connecting with pivot pins 37 on the bows 30 adjacent the pivots 31 carrying the latter, which links are so arranged that on upward movement of the upper section B the end sections F and G will be automatically swung to their extended positions and on downward movement of the section B will be swung to their folded positions. To accomplish this action the pivots 31 of the bows 30 are disposed on a vertical plane offset inwardly relative to the pivots 26 of the bows 25 and the links 35 are arranged to extend diagonally across a plane intersecting the axes of the pivots 26 and 31 so that the lower ends of the links connect with the section F forward of the pivots 26 and connect at their upper ends with section G rearward of the pivots 31, and in order to permit lost motion between the links 35 and the pivot pins 36, the links are formed with longitudinally extending slots 36' through which the pins 36 extend.

The closure wall 33 and the bows 30 are formed on a parabolic curve so that when the end sections F and G are in their extended positions, a streamlined contour will be afforded extending outwardly and downwardly from the lips 24 at the ends of the room membrane 23, as particularly shown in Figs. 1 and 6. The upper margin of the wall 33 underlies the lip 24 so as to afford a water shedding joint at the juncture of the upper portion of the end section G and the roof membrane 23 when the section G is either in its extended position as shown in Fig. 6 or in its folded position shown in Fig. 7.

As a means for affording a waterproof joint between the ends of the end sections F and G when the trailer body is in its collapsed position, the upper end section G which is formed to overlie the lower end section F when the sections are in their folded position is formed with marginal extensions 38 affording shoulders 39 on their under side protruding outwardly from the outer faces of the end plates 32, and which shoulders are arranged to abut against the end margins 40 of the side walls 14 when the upper end section G is disposed in its folded position, as particularly shown in Figs. 2 and 5.

Removable fillets, not necessary to be here shown, are employed to seal the gap between the end plates 32 and 28 when the sections F and G are disposed in their extended position.

In the operation of the invention, the trailer body when disposed in its extended position as shown in Fig. 1, that is with the upper section B in its elevated position and the end sections F and G in their extended positions, is in condition for occupancy, with the space interiorly thereof afforded by extended end sections F and G admirably suited for the reception of demountable superimposed pairs of bunks, as indicated by dotted lines h and i in Fig. 1. With the parts thus disposed, access may be had to the interior of the trailer body through a suitable sectional door H which may be of any suitable construction.

When it is desired to collapse the trailer body the hydraulic jacks E are operated to first slightly elevate the upper end sections G relative to the lower end section F which movement is permitted by reason of a slight clearance afforded between the lower end of the slot 36' and the pin 36. This movement is such as to permit the operator to press the upper edge of the wall c of the section F inwardly and thereby effect disengagement of the lips or flanges 34 of the upper end sections G from the upper margins of the lower end sections F whereupon the upper end sections G are momentarily manually held in their outermost positions while the jacks E are operated to effect initial downward movement of the upper body section B, which downward movement will effect downward movement of the upper end sections G aided by gravitational movement of the latter and thereby exert a downward and inward thrust on the links 35 which when the latter has been advanced sufficiently to bring the upper ends of the slot 36' into engagement with the pin 36 will act through the projections g on the lower end sections F to rock the latter inwardly. Continued downward movement of the upper body section B advances the lower end sections F to their inwardly extended positions shown in Figs. 7 and 9, and at the same time causes the upper end sections G to swing inwardly in overlapped relation to the end sections F until the shoulders 39 abut against the end margins 40 of the side walls 14, as shown in Figs. 2 and 5, thereby decreasing the length of the trailer structure. As the sections F and G move to their folded position a slight movement of the section G relative to the section F occurs so that the link 35 advances relative to the pivot 36 as shown in Fig. 7. When in its fully collapsed position the upper body section B is disposed with the lower margins of its side walls 14 seating on the side rails 17 of the chassis. In effecting this collapsing of the trailer body, at least the upper bunks i are removed or suitably rearranged to permit inward swinging movement of the lower end sections F. The lower bunks h however may be affixed to the end sections F to swing therewith if so desired.

Manifestly when the trailer body is in its collapsed position, its height and length will be greatly reduced.

In restoring the trailer body to its extended position the hydraulic jacks are collectively operated to elevate the upper body section relative to the lower body section, which movement causes the links 35 to effect upward and outward movement of the lower end sections F with corresponding movement of the upper end sections G until the pairs of end sections are brought to their extended positions with the contiguous edges of the sections abutting each other. On initial upward movement of the upper body section B and end sections G the links 35 will advance the length of the slots 36' therein before effecting upward movement of the lower end sections F.

While I have shown and described the trailer body as equipped at each end thereof with foldable end sections, it will be understood that in some instances it may be equipped with such end sections at only one end thereof.

While I have shown and described a specific embodiment of my invention, I do not limit myself to the exact details of construction and arrangement shown and accordingly the invention embraces such changes in the parts and the construction and arrangement thereof as come within the meaning and scope of the appended claims.

I claim:

1. In a motor vehicle trailer, a lower body section, an upper body section, means for raising and lowering said upper body section relative to the lower body section, a pair of foldable end sections carried on said body sections, said end sections being pivotally carried on said body sections to swing outwardly and inwardly from the ends thereof and arranged to extend the body sections when the latter are disposed in their extended positions relative to each other and to fold inwardly relative thereto when said body sections are collapsed relative to each other, and direct connections between the pair of the foldable end sections for effecting collective swinging movement thereof.

2. In a house trailer for motor vehicles, a lower body section, an end section pivoted on said body section to swing outwardly and inwardly relative thereto, an upper body section, means for raising and lowering said upper body section relative to said lower body section, an end section pivotally carried on said upper body section to swing outwardly and inwardly relative thereto having a lower margin formed to overlie and interengage the upper margin of the end section on the lower body section when said end sections are disposed in their extended position.

3. In a house trailer for motor vehicles, a lower body section, an end section pivoted at its lower end portion on said body section to swing outwardly and inwardly relative thereto, an upper body section, means for raising and lowering said upper body section relative to said lower body section, an end section pivotally carried at its upper end on said upper body section to swing outwardly and inwardly relative thereto having a lower margin formed to overlie and engage the upper margin of the end section on the lower body section when said end sections are disposed in their extended position, and rigid links directly connecting said end sections for effecting combined swinging movement of said end sections on raising and lowering the upper body section relative to the lower body section.

4. In a house trailer for motor vehicles, a lower body section, a foldable end section pivotally mounted at a lower end portion thereof on said body section to swing from a position projected from the end of the body section to a position interiorly thereof, an upper body section arranged in telescopic relation to said lower body section, means for raising and lowering said upper body section, a foldable end section carried by said upper body section pivotally connected at its upper end to swing to an extended position from the end of the upper body section having a lower end arranged to overlie the upper margin of the foldable section on the lower body section, and a rigid link connecting said folding end sections for effecting combined swinging movement of said sections on raising or lowering the upper body section relative to the lower body section.

5. In a house trailer for motor vehicles, a lower body section, a foldable end section pivotally mounted at a lower end portion thereof on said body section to swing from a position projected from the end of the body section to a position interiorly thereof, an upper body section arranged in telescopic relation to said lower body section, means for raising and lowering said upper body section, a foldable end section carried by said upper body section pivotally connected at its upper end to swing to an extended position from the end of the upper body section having a lower end arranged to overlie the upper margin of the foldable section on the lower body section, and a rigid link connecting said folding end sections for effecting combined swinging movement of said sections on raising or lowering the upper body section relative to the lower body section, said body sections having overlying side walls and said folding section on the upper body section having end walls arranged to extend between the side walls of the body sections when the latter are disposed in their folded telescoping position relative to each other.

6. In a trailer, a lower body section, an upper body section mounted for vertical movement relative to the lower body section, a foldable end section pivoted on the lower body section to swing inwardly and outwardly thereon, a foldable end section pivoted on the upper body section to swing inwardly and outwardly thereon and arranged to overlie and engage the other foldable end section when both of said foldable end sections are disposed in their innermost positions, and direct connections between said foldable end sections for effecting collective movement of the foldable end sections to and from their innermost positions.

7. In a motor vehicle trailer, a lower body section, an upper body section, means for raising and lowering said upper body section relative to the lower body section, a unitary end section on each of said body sections pivotally mounted to swing outwardly and inwardly, said end sections having a back wall and end plates rigidly connected to said back wall to form enclosed extensions of the body sections when the latter are disposed in their extended positions relative to each other with the margins of the end plates and back walls of said end sections positioned adjacent each other, and said end sections being arranged to fold inwardly in overlapping relation when said body sections are collapsed.

8. In a motor vehicle trailer, a lower body section having upstanding side walls, an upper body section including a top wall and depending side walls with the latter arranged to overlie the side walls on the lower body section and whereby said body sections collectively form an enclosure, a foldable end section on each of said body sections pivotally connected to swing outwardly and inwardly relative thereto, each of said end sections having end plates arranged in overlapped relation with the side walls of the body sections, and each of said end sections having back walls rigidly connected to the outer margins of said end plates whereby said end sections when disposed in their extended positions form an enclosed continuation of the closure formed by said body sections, and direct connections between said foldable sections for effecting collective movement of the foldable sections to and from their extended positions on raising and lowering the upper body section relative to the lower body section.

9. In a motor vehicle trailer, a pair of superimposed upper and lower end sections each including end plates and back walls rigidly connected together to form each end section as a unitary structure throughout, a pivotal support for the upper end of the upper end section, a pivotal support for the lower end of the lower end section, said end sections being carried on said pivotal supports to swing vertically with their back walls and adjacent end plates in overlapped relation to each other, means for raising and lowering the upper end section relative to the lower end section, and a rigid link having one end pivoted to the upper section adjacent to but in offset relation to the axis of the pivotal support thereof and having its other end pivoted to an end plate of the lower section remote from the pivotal support of the lower section; said link acting on upward movement of the upper section relative to the lower section to swing said end sections collectively outwardly to dispose the margins of said end sections in contiguous relation to each other.

10. In a motor vehicle trailer, a pair of superimposed upper and lower end sections each of which embodies a back wall and parallel end plates projecting from the side margins of the back walls, a pivotal support for the upper section adjacent the upper portion of the back wall thereof, a pivotal support for the lower section adjacent the lower end of the back wall thereof, said sections being mounted on said pivotal supports to swing vertically relative to each other, and means for raising and lowering the pivotal support of the upper section relative to the lower section; said sections being formed to telescope each other when the upper section is in a lowermost position relative to the lower section and being adapted on elevating the upper section relative to the lower section to be positioned with the outer edges of the back walls and end plates of the sections in contiguous relation to each other.

CECIL F. DAVEY.